United States Patent [19]

Johnson et al.

[11] 4,269,506

[45] May 26, 1981

[54] APPARATUS FOR MEASURING THE INFLUENCE OF PHYSICAL PARAMETERS ON THE LENGTH OF A PATH

[75] Inventors: Mark Johnson, Chappaqua, N.Y.; Reinhard Ulrich, Leonberg, Fed. Rep. of Germany

[73] Assignee: Max-Planck-Gesellschaft zur Forderung der Wissenschaften e.V., Göttingen, Fed. Rep. of Germany

[21] Appl. No.: 30,945

[22] Filed: Apr. 17, 1979

[51] Int. Cl.³ .............................................. G01C 3/08
[52] U.S. Cl. ..................................... 356/5; 73/339 R; 73/800; 330/4.3
[58] Field of Search ........................... 356/5, 35, 35.5; 73/800, 339 R, DIG. 11; 330/4.3

[56] References Cited

U.S. PATENT DOCUMENTS

| | | | |
|---|---|---|---|
| 3,503,680 | 3/1970 | Schenkerman | 356/5 |
| 3,572,928 | 3/1971 | Decker, Jr. | 356/4 |
| 3,863,177 | 1/1975 | Damen et al. | 330/4.3 |
| 3,981,592 | 9/1976 | Williams | 356/5 |
| 4,068,952 | 1/1978 | Erbert et al. | 356/5 |
| 4,107,684 | 8/1978 | Watson, Jr. | 343/7.5 |
| 4,151,747 | 5/1979 | Gottlieb et al. | 73/339 R |
| 4,163,397 | 8/1979 | Harmer | 73/800 |

*Primary Examiner*—Stephen C. Buczinski
*Attorney, Agent, or Firm*—Craig & Antonelli

[57] ABSTRACT

In a device for determining the influence of physical parameters on the length of a path, an elastically stretchable optical fiber is guided with minimal pretensioning along the path which is subjected to length changes. The optical fiber is mounted at least sectionally on supports subjected to positional changes with changes in the length of the path. A transit-time measuring device is also provided as part of the measuring device together with the optical fiber. The transit-time measuring device includes a light-pulse repeater forming a closed signal path with the optical fiber. The repeater generates signal pulses circulating in the signal path with the periodicity of the signal circulation time of the signal path. From an electronically measured total travel time through the closed signal path and a total number of which signal pulses the electrical display signal can then be derived to determine the length and change in length of the path being measured.

40 Claims, 6 Drawing Figures

APPARATUS FOR MEASURING THE INFLUENCE OF PHYSICAL PARAMETERS ON THE LENGTH OF A PATH

BACKGROUND OF THE INVENTION

The present invention relates to a device for determining the influence of physical parameters such as pressure, ambient temperature, shear or tensile forces, or the like, on the length of a path, with an optical length-measuring device responding to the change in path length, said measuring device being capable of producing an electrical display signal characteristic at least of the change in path length.

It is known to determine changes in physical parameters, which can be visualized as changes in optical path lengths. In many cases, this procedure is equivalent to a change in a mechanical path length, in such a manner that these path length changes are measured with the aid of an interferometer (see, e.g. Luger, *Lexikon der Tecknik*, Rowohlt, 1972, Vol. 26, p. 479). A device suitable for measuring changes in high temperatures, using a Michelson interferometer, of the type cited hereinabove, can then be so designed, for example, that the movable mirror of the interferometer is mounted at the free end of a rod, said rod being firmly gripped at its other end. The temperature expansion coefficient of the rod is known, so that the changes in the length of the rod provide a direct indication of the temperature changes correlated therewith. The number of output pulses from a receiver located at the interference point, said pulses occurring sequentially in the course of a temperature change from $T_1$ to $T_2$, and said receiver generating an output pulse in response to constructive interference, is then a means of directly measuring the temperature. These receiver output pulses can be detected by an electronic counter and displayed appropriately in digital or analog form.

Generally, interferometric measurements are very accurate, since the absolute measurement error is only on the order of magnitude of the wavelength of the coherent light used for measurement. But a device of the type described hereinabove, provided with an interferometer as the measuring device, suffers from serious disadvantages, which render it unsuitable for numerous applications.

For example, in interferometric measuring systems, the measurement range is theoretically limited by the coherence length of the measuring light used. Admittedly, it is quite possible by using lasers to have coherence lengths of several kilometers in the optical range. However, the engineering costs required are considerable, and the coherence length is only in the meter range (for example 1 to 5 meters) when a conventional laser is used as the light source.

In practice, this means that in many instances the changes in length of a path marked by a body, associated with changes in a certain parameter, can be detected very precisely. But this is not so in regard to the reference length of the body subjected to the change in length, associated with a certain value of this parameter. Thus, in the final analysis, the absolute value of the modified parameter suffers from the error with which the reference value can be determined by other measurements, which is generally carried out with less accuracy.

On the other hand, it is practically impossible to detect changes in length which occur along a curved path, since the path of the measuring beam, which requires at least intermittent rectilinear light paths with direct, undisturbed visual contact, cannot be adjusted with sufficient accuracy to any path. This is also true of the case in which a transit-time measuring device is used, as in making absolute measurements of large distances (for example, the distance from the Earth to the Moon), in order to determine the length of a path by measuring the transit time of light pulses between the beginning and end of this path.

SUMMARY OF THE INVENTION

One object of the invention is, therefore, to provide a device of the type described hereinabove, with which a length along a given path, as well as changes in that length associated with a certain physical influential parameter, can be measured with an accuracy sufficient for a sufficiently accurate determination of this influential parameter, whereby this arrangement can be constructed with simple technical means and is also largely insensitive to disturbing influences.

This and other objects are achieved according to the invention by providing an elastically stretchable optical fiber guided with sufficient pretensioning along an optical path which is subjected to length changes. The optical fiber is nonstretchably mounted at least sectionally on supports subjected to positional changes with the changes in the length of the path. A transit-time measuring device is also provided as part of the measuring device together with the optical fiber. The transit-time measuring device includes a light-pulse repeater forming with the fiber a closed signal path, said repeater generating signal pulses circulating in the signal path with the periodicity of the signal circulation time of the signal path, from the electronically measured total travel time and total number of which signal pulses the electrical display signal can be derived.

By virtue of its functional characteristics, the arrangement according to the invention offers the advantage that within the limits set by the flexibility of the optical fibers (in order not to damage the fibers, the optical fibers must not be installed with excessively small radii of curvature, and, therefore, should be at least approximately equal to 100 times the fiber diameter), the optical fibers can be permanently installed along any path. Also, because of the small fiber diameter, the direction of the optical path can be given an optimum approximation to the path to which they are subjected under a wide variety of influences of length change, so that this path can be measured especially accurately. For example, one or more turns of the optical fiber can be installed around the circumference of a pressure vessel, and pressure changes in the vessel can be measured from their length changes, said pressure changes causing a proportional change in the circumference of the vessel. It is also possible to install the optical fiber along the supporting cable of an aerial cable car or a suspension bridge, and obtain information on loading by measuring the fiber length, or to be able to detect irreversible changes in the length of said support cables which indicate aging effects.

In the sample applications mentioned above, the arrangement according to the invention is used for measuring purposes for which, at least as far as the determination of strain proportional to force is concerned, also electrical strain gauges could be used. However, the arrangement according to the invention has an advantage over such strain gauges in that it is much less subject to interference from electromagnetic noise or extreme temperature variations, such as can occur, for example, on a pressure vessel.

Another advantage of the arrangement according to the invention, especially by comparison with interferometric measuring devices, consists in the fact that the calibration is maintained, even if there is a power outage during a measurement cycle, since the changes in the fiber length are not determined from some arbitrary reference length, but from the difference in transit times, which are proportional to absolute fiber lengths. The cycle time T of the signal path which comprises the optical fiber and the pulse repeater is the sum of the transit time $t_{opt}$ of the light pulse emitted by the pulse repeater in the optical path marked by the optical fiber and the transit time $t_{el}$ of the signal which triggers the emission of the light pulse in the pulse repeater. Since $t_{el}$ is the same for all fiber lengths, absolute calibration is easily accomplished by using one fiber for which $t_{opt}$ is known to measure the total transit time $T = t_{opt} + t_{el}$. One can then determine from this, once and for all, the transit time $t_{el}$ which is critical for the pulse repeater.

Since the accuracy of the length and/or stretch measurements which can be performed with the arrangement according to the invention is essentially determined by the contancy of the transit time $t_{el}$ in the pulse repeater, it is advantageous if, according to a feature of the invention, the component $t_{opt}$ of the transit time of the signal pulses, which is a function of the fiber length, for a period of $T = t_{el} + t_{opt}$ of the signal pulse train generated by the pulse repetition is large relative to the transit time component $t_{el}$ of the pulse repeater caused by the activation of the pulse repeater, so that the influence of the transit time component $t_{el}$ is relatively small in comparison with the optical transit time component $t_{opt}$. This can be accomplished by making the optical fiber relatively long, and, if desired, running it several times along the path to be covered. In this case, one could use a relatively "fast" pulse circuit to trigger a voltage-controlled light-emitting diode, which serves as a transmitter, in the case of an electronically controlled pulse repeater.

The transit time $t_{el}$ in such a pulse repeater can be kept constant to within approximately ±1 ps by using ordinary means, corresponding to an accuracy for length measurement of approximately ±0.2 mm. In order to utilize this accuracy to the full extent, it is necessary in many cases to average the cycle period duration T over a plurality of signal cycles. A simple starting and evaluating device, suitable for this purpose, is provided by another aspect of the invention.

When the total measurement time consisting of a plurality of cycle periods is very large, for example, when it is on the order of seconds, for no other reason than the imperfect monochromatism of the signal light used, broadening of the light pulses is unavoidable, because of the material dispersion of the optical fibers. As a result, a light D.C. flux would eventually circulate in the fiber and naturally would no longer permit any transit time measurements. For this reason, it is advantageous, according to another aspect of the present invention, if the pulse duration of the light pulses emitted by the pulse repeater is shorter than that of the light pulses received by the pulse repeater, and is preferably constant. This can be achieved in a simple manner by using the features of the invention in a pulse repeater which uses a voltage-controlled light pulse transmitter.

It is also favorable for optimum measurement accuracy for the triggering time for emission of a new light signal to be as independent as possible of the absolute height and the details of the pulse shape of the signal received by the pulse repeater, since the emitted light pulse could otherwise be distorted by noise from the pulse repeater amplifier. Instead, the triggering point should be determined by the entire envelope curve of the received light pulse. A simple threshold value trigger, whose threshold is set to a fixed value, for example to half the average height of the received pulses, could be forced to cause a varying transit time $t_{el}$ in the pulse repeater, for example by changes in fiber losses as a result of bending of the fiber. Such variations, however, could be avoided with very good results by using trigger circuits including a discrimination circuit which triggers when the signal amplitude of a light signal received at the receiver reaches a predetermined fraction of the maximum amplitude or a slope detector which responds to the rising and falling slopes of the output pulses of the receiver.

An even sharper definition of the trigger time is made possible by not using a single pulse as the emitted light signal. Instead, a pulse combination comprising a plurality of light pulses is used, including, for example, a pulse sequence distributed in characteristic fashion over a portion of the cycle time. The distribution of such light pulses over the cycle period means that this period is utilized optimally from the standpoint of the most accurate possible measurement of the transit time by averaging over many single pulses, so that relatively short total measurement times will suffice. It is therefore favorable for the individual pulses to be emitted in as "dense" a sequence as possible, in other words, the individual pulses should be as short as possible and in particular should have slopes which are as steep as possible, since this results in a more precise definition of the temporal positions of the pulses. Other features of the invention, which can be used individually or in partial combinations, make it possible to keep the influence of the material dispersion upon the pulse duration advantageously small, resulting in rise and fall times for the pulse slopes of approximately 1 ns.

If the path subjected to a change in length is a closed curve, as is the case in the example cited above of measuring the pressure by determining the circumference of a pressure vessel, it is then easily possible to couple the light pulses produced by the transmitter of the pulse repeater to one end of the optical fiber running along the path, and to receive these pulses at the other end, while keeping the transit time $t_{el}$ in the pulse repeater small. In the case in which the receiver is a photo diode and the transmitter is an LED, the transit time $t_{el}$ is an electronic transit time. In this signal path, the signal used to measure the transit time then circulates partially as an optical signal and partially as an electrical signal, always in the same direction, so that the same pulse sequence occurs at each point in this signal path.

An alternate embodiment of the arrangement according to the invention is characterized by the features wherein the transmitter and the receiver of the pulse repeater are located at the same end of the optical fiber. The optical path marked by the fiber is then utilized twice, which is advantageous in view of the fact that $t_{opt}$ should be as large as possible relative to $t_{el}$. This embodiment of the invention is especially well suited for measuring the length of a path whose end is far from the beginning, as is the case for example in measuring the length of a support cable.

When the light-pulse transmitter and the receiver of the pulse repeater are mounted concentrically and appropriate arrangements are made such that the receiver can "see" only the returning light pulses and not the emitted light pulses, it is also possible to dispense with a partially transparent 45° mirror used to decouple the returning light pulses, resulting in an especially simple designated arrangement. The arrangement provided by the features of a further embodiment has the characteristic that a train of light pulses passing through the fiber is created in response to a single starting pulse, with the temporal spacing of these pulses being exactly equal to their optical transit time $t_{opt}$ in the fiber, provided that mirrors are mounted directly against the end surfaces of the fiber. One of the mirrors mounted at the input to the fibers, however, must be partially transparent, so that a portion of the light from the returning light pulses can be decoupled to measure the transit time, the intensity of these pulses decreases steadily so that only a limited number of light pulses which can be used for measurement is obtained from one original starting pulse. A larger number of light pulses, required for an exact measurement of the path length, can be achieved, however, by repeated actuation of the start-pulse transmitter, which is actuated for example, according to fixed time intervals. Alternately, the start-pulse transmitter may be controlled by a discriminator which detects the intensity of the returning pulses, and then actuates the starting pulse transmitter, as soon as the intensity of the returning pulses falls below a lower limit which is still sufficient for reliable detection.

To determine the purely optical transmit time $t_{opt}$, then only those pulses derived from a primary pulse by reflection at the partially transparent mirror are used advantageously. On the other hand, if an arrangement is operated so that the pulses derived from the received pulses by means of a pulse repeater overlap, in proper phase, the pulses derived from a primary pulse by reflections, it is possible to operate in "resonance". All received pulses then have a same intensity. This mode of operation requires that the transmit time in the pulse repeater is equal to a rational fraction of the transit time or equal to the optical transit time itself. Although the transit time in the pulse repeater can have considerable values, its influence upon the measurement accuracy is minimal is this case, since its absolute value is eliminated in advance. Also, variations in the transit time in the pulse repeater, owing to the weak coupling of the "resonator" through the slightly transparent mirror, cannot have a major influence upon the period of length any longer.

The influence of the transit time $t_{el}$ in the pulse repeater and its variations, which must be taken into account especially is electronically controlled pulse repeaters, can be completely within the range of measurement accuracy, avoided, finally, by using optical pulse repeaters in the form of an optical amplifier.

A device provided with a measuring signal path and a reference signal path according to still further features of the invention has the advantage that the influence of all parameters is eliminated which affect the lengths of the fibers in the two signal paths in identical fashions.

Other objects, features and advantages of the present invention will become apparent from the below-mentioned detailed description of the embodiments.

DETAILED DESCRIPTION OF THE PREFERRED EMBODIMENTS

The fiber-optic measuring devices shown in FIGS. 1 and 2 to 6 have the purpose of determining as accurately as possible the dimensions and dimensional changes, characteristic of a wide variety of influential parameters, of bodies along arbitrary paths or curves, thereby making it possible to draw conclusions about the values and changes of these influential parameters.

Figure 1:
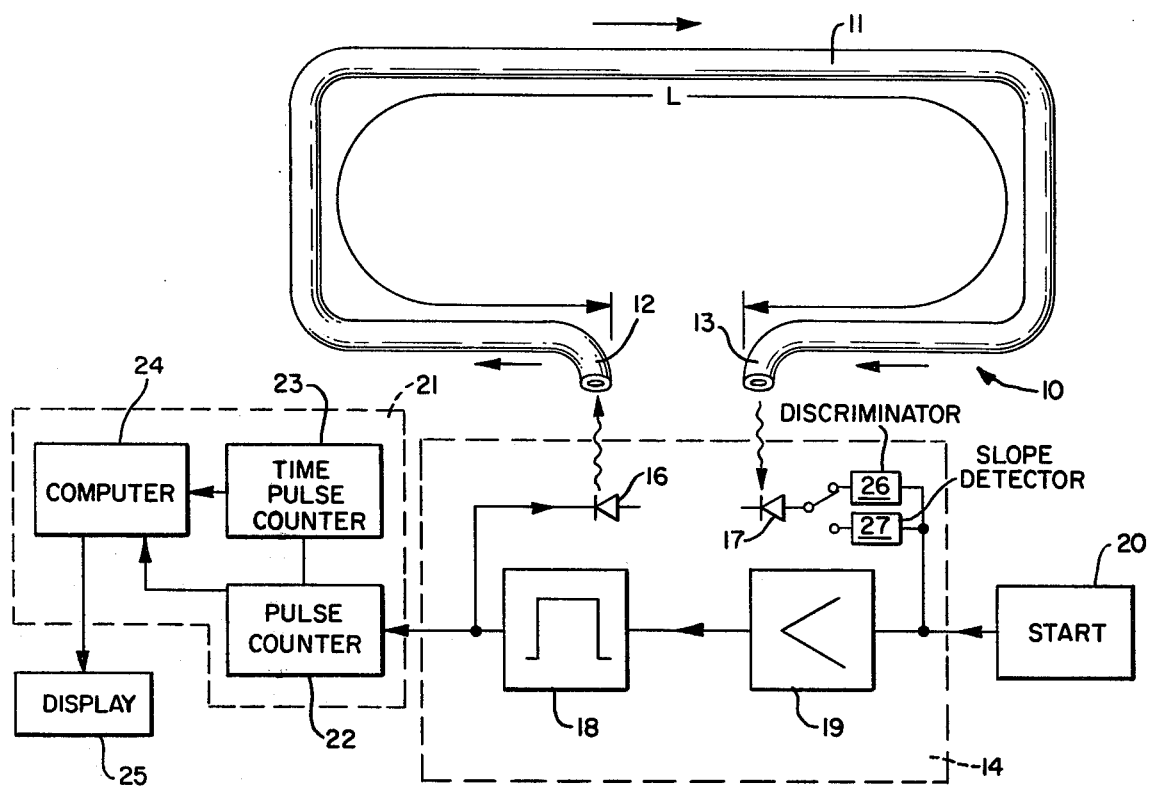
FIG. 1 is a first embodiment of a fiber-optic measuring device according to the invention, with an optical fiber running along a closed path and an electronically triggered pulse repeater.

The fiber-optic measuring device 10 shown in FIG. 1 is especially suitable for path measurement along a closed curve, for example the circular circumference of a large vessel or tank subject to variable internal pressure; for example a liquefied gas tank of a ship or the like. In this connection, the fiber-optic measuring device 10 can have the function of a safety device, which triggers a warning signal when the pressure in the tank and hence its circumference have exceeded a critical limiting value.

In detail, the fiber-optic measuring device 10 is constructed with an elastically stretchable, monofilament optical fiber 11 which is firmly attached along the closed path with a length L to be monitored. The fiber 11 can be attached by any convenient means such as clamping it to the path being measured at spaced points. The points at which the fiber 11 is clamped should be subject to change with a change in path length so that this change in length of the path affects the length of the optical fiber 11. However, the mounting should be such that the fiber is not stretched in the mounting clamp itself. The stretchability of the optical fiber 11 is a few percent of its length. Preferably, the optical fiber 11 is mounted along the path to be monitored with a degree of pretensioning such that it can follow both an increase and a decrease in the length of said path. Since the optical glass fiber 11 has a very small diameter (typical diameters are between 30 and 200 microns), the path to be monitored by the signal path formed by optical fiber 11 can be marked very exactly.

To produce short light pulses, which can be fed into one end 12 of optical fiber 11 and received at the other end 13 of optical fiber 11 after a transit time $t_{opt}=L/v$ determined by the length L of the optical fiber, where v is the group velocity of the light in the optical fiber 11, a pulse repeater 14 is provided which forms a closed signal path together with optical fiber 11. A measuring signal circulates periodically through this closed path partially as an optical signal and partially as an electrical signal. Pulse repeater 14 is made up of known components including an electrically operated light-pulse transmitter 16, which emits light pulses of appropriate length and appropriate shape for voltage pulses, said light pulses being fed into one end 12 of the optical fiber. In addition, the pulse repeater 14 comprises a photoelectric receiver 17, which converts the light pulses which arrive at the other end 13 of optical fiber 11 after a transit time $t_{opt}$ into analogous voltage pulses.

Since the light pulses, produced by the light pulse transmitter 16, for example a GaAs laser diode, are broadened slightly along their path through the optical fiber 11 as a result of the mode and material dispersion, the pulse duration of the electrical output pulses of the receiver 17 is somewhat longer than the duration of the primary light pulses. However, in order to have light pulses of definite length and shape available for measurement, a pulse shaper 18 which triggers light-pulse transitter 16 is provided. This pulse shaper 18 converts the output pulses of an amplifier 19, which amplifies the receiver output signals, into trigger pulses of definite length and shape. In addition, a discriminator circuit 26 may be provided which triggers when a the signal amplitude of the light signals received at the receiver reaches a predetermined fraction of their maximum amplitudes. Alternatively, a slope detector 27 may be provided, if desired, to trigger at a time which is the temporal average of the rising and falling slopes of the output pulses of the receiver 17. The output pulses of the slope detector 27 have a definite temporal relationship to the temporal "center of gravity" of the received pulses. These circuits 26 and 27 are useful to reduce variations of the transit time $t_{el}$ of the light-pulse repeater, and are well-known in the art.

The light-pulse repeater 14, which comprises receiver 17, amplifier 19, pulse shaper 18, and light-pulse transmitter 16, has a transit time $t_{el}$ which is added to transit time $t_{opt}$ of the light pulses in the fiber 11 to form the total signal transit time $$T = t_{opt} + t_{el} \quad (1)$$

This then is the period length with which a signal can be observed at any point in the closed signal path 11 and 14 as an optical and/or electrical signal after a first light pulse has been triggered by a starting device 20.

In order to measure as exactly as possible the length of this period T, a period length measuring device 21 is provided from which, at a known transit time $t_{el}$ of the signal in pulse repeater 14 according to relationship $$l = v(T - t_{el}) \quad (2)$$

the length L of the optical fiber 11 can be determined, and with which the period length T and/or the pulse repetition frequency of the signal pulses can be determined with considerable accuracy by averaging over a great many signal cycles. This period-length measuring device 21 comprises a pulse counter 22, likewise activatable by means of starting device 20. The counter 22 counts the voltage output pulses of the pulse shaper 18 and a time-pulse counter 23, activated simtultaneously with pulse counter 22, said time pulse counter 23 counting the output pulses of a quartz-controlled oscillator which appear at high frequency until voltage-pulse counter 22 has reached a presettable counter status. The pulse counter 22 generates a pulse to stop the time pulse counter 22 after this predetermined final counter status is reached. The counter status of the time pulse counter 23 is then directly proportional to the period length T, averaged over the number of signal cycles counted by pulse counter 22, and can be determined from the known frequency of the quartz-controlled reference oscillator and the number of observed signal cycles by means of an appropriate digital computer 24 which forms part of the period-length measuring device 21. If desired, the measured total transit time T and the number of signal pulses can be used to generate an electrical display signal for the electric display means 25.

By appropriate measurement, transit time $t_{el}$ in pulse repeater 14 can be determined once and for all for a given arrangement, whereby the period length of the system is measured with a fiber of known length. This naturally assumes that the group velocity v of the signal light used can be determined from the known refractive index data of the fiber, so that, in order to be able finally to evaluate relationship (2), it is sufficient to measure period length T. Once the value $t_{el}$ of the cycle period duration T is determined, the arrangement according to FIG. 1 will have been calibrated once and for all, whereby the calibration suffers only from the error caused by variations in transit time component $t_{el}$. This error can be kept very small by an appropriate design for amplifier 19 and pulse shaper 18 as well as by an appropriate choice of receiver and transmitter diodes 17 and 16. If necessary, it may be advantageous to keep pulse repeater 14 at a constant operating temperature by using a temperature-regulating device. Such a temperature-regulating device can be any conventional regulator appropriate for pulse repeater systems.

In order to test the measurement accuracy which can be achieved with a system according to FIG. 1, a quartz fiber with a length L=200 m was used. This quartz fiber was wound in 40 turns about two axially parallel drums with a diameter of approximately 14 cm, whose distance apart at the center was 2 m and could be changed by precise amounts. The quartz fiber was a so-called gradient fiber, commercially available from the firm of SEL, whose effective refractive index is about 1.46. Such gradient fibers generally have a refractice index which increases from the jacket to the core. As a transmitting diode, a GaAs laser diode was used, whose light pulses had a pulse duration of 6 ns with rise and fall times of approximately 1 ns. The wavelength of the light pulses emitted by the GaAs laser diode is 905 nm, corresponding to a group velocity v in the quartz fiber of approximately $2.1 \times 10^8$ m/sec. The transit time $t_{el}$ in the pulse repeater was 40 ns, giving a total cycle period length T of approximately 1 microsecond. Using a commercial electronic counter, having a quartz oscillator as a comparison standard, the period length T could be measured with an accuracy of approximately $10^{-12}$ second by averaging over $10^6$ cycle period durations T, corresponding to a total measurement time of 1 sec. The constancy of the period length T, essentially determined by the contancy of the transit time component $t_{el}$ in the pulse repeater, was $\pm 1$ ps, corresponding to an accuracy in the length measurement of approximately $\pm 0.2$ mm.

Figure 2:
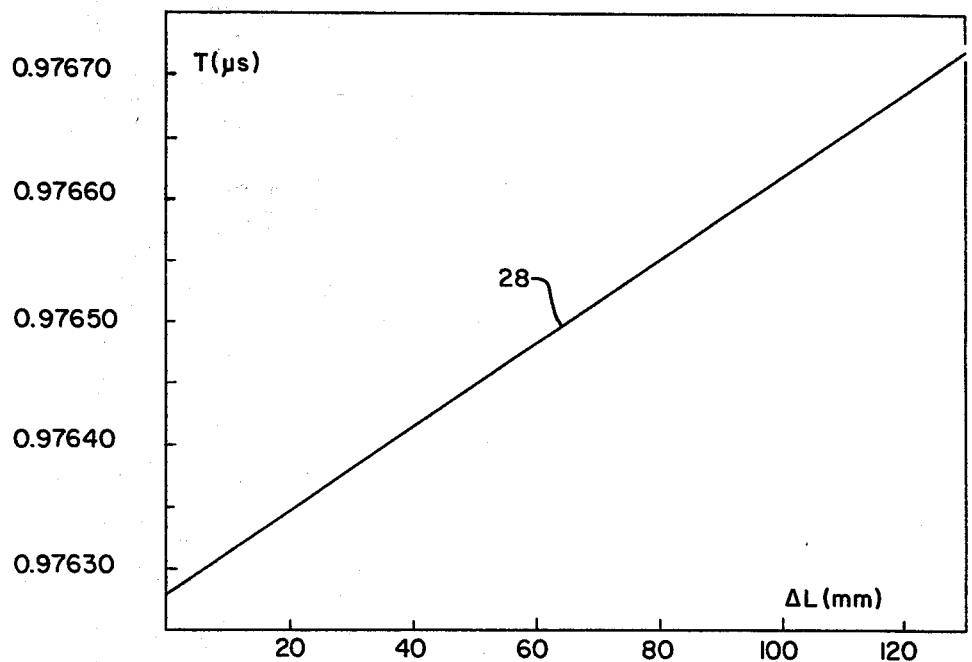
FIG. 2 is a graph showing an actually measured signal transit time in the signal path formed as shown in FIG. 1 by the optical fiber and the pulse repeater versus changes in fiber length.

In the graph in FIG. 2, the relationship between fiber extension $\Delta L$ and cycle period duration T, as measured with the above-mentioned laboratory apparatus, is represented by curve 24. The absiccsa is the change in length ΔL of the quartz fiber, 200 m long, in millimeters, while the ordinate is used to plot the cycle period length T in microseconds, on a linear scale. The linear relationship, which one would expect from equation (2), between the change ΔL in fiber length and the change in cycle period length T is very clearly illustrated by the linear path of curve 28 within the limits of measurement accuracy. This indicates that fiber-optic measuring instruments are very well suited for measuring influential parameters which cause the stretching of fibers, for example for detecting forces which act directly or through a mechanical transmission device to exert a suitable stretching force upon the fibers.

As far as installing the measuring devices is concerned, the fact is important that good optical fibers allow to be stretched elastically up to about several percent of their length. Thus, in the example of the 200 m long fiber, a measurement range of several meters was available which permitted very precise measurements at the above-mentioned length-measurement accuracy of ±0.2 mm. Depending on the diameter of the fibers used, forces in the range from about 1 p to 100 kp can also be measured by exerting them directly upon an optical fiber, which is installed in a manner similar to that in the laboratory equipment described above.

In measuring path lengths and path-lenth changes, on the other hand, fiber diameter plays only a secondary role. However, if it is desired to obtain absolutely the most accurate measurement of a very long distance, a relatively thick fiber with an outside diameter of approximately 200 microns is used, in order to reduce the chance of breakage under mechanical stress. Conversely, when path-length changes are being measured and the measurement distance is short, a thinner fiber with a diameter of approximately 50 microns is advantageous in order to keep down the reaction of the measurement device on the object being measured as a result of the elastic tension on the fibers.

Favorable characteristics of optical fibers, which can be utilized advantageously in the measuring device 10 according to FIG. 1 and in devices according to FIGS. 2 to 6, yet to be described, include the fact that these fibers, by comparison with most other materials, have a low thermal expansion coefficient, which is especially favorable for their use for absolute length measurement. Special fibers made of quartz glass have a relative thermal expansion of only $(1/L)(\partial L/\partial T) \cong 0.4 \times 10^{-6} K^{-1}$. The resultant measurement errors due to thermal expansion of the fiber are therefore negligibly small by comparison with the temperature coefficients of the group velocity $(1/V)(\partial V/\partial T)$, which is approximately $5 \times 10^{-6} K^{-1}$, and is therefore comparable with the thermal coefficients of conventional electrical strain gauges, which can be used for similar purposes. By comparison with the latter, a fiber-optic measuring device has the advantage of complete insensitivity to electromagnetic disturbing fields, such as can occur, for example, in the vicinity of electrical machines. Furthermore, a fiber-optic length and/or length-changemeasuring device is suitable for use even at extremely low and high temperatures. Fibers of quartz glass can be used, for example, up to temperatures just slightly below their transformation point ($T_g \cong 1700°$ K.) without a significant influence on their optical properties. Another point worth mentioning is the insensitivity of quartz glass fibers to ionizing radiation, so that the system according to the invention is also suitable for measurements in nuclear reactors.

Figure 3:
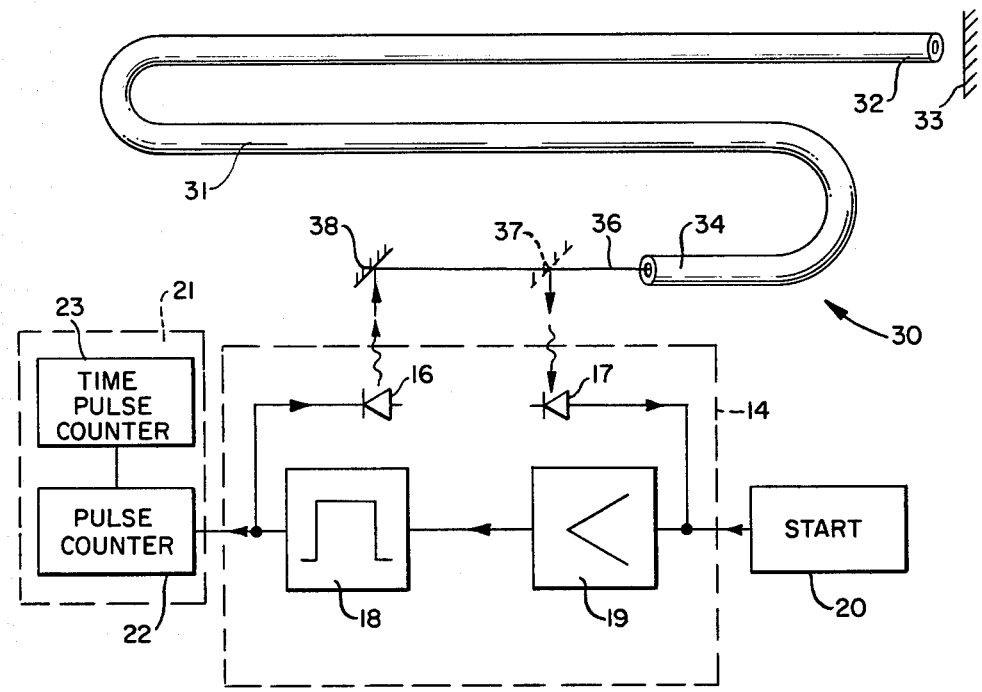
FIG. 3 is an alternate embodiment of the fiber-optic measuring device according to the invention, with an optical fiber terminated at the far end by a mirror.

FIG. 3 shows a fiber-optic system 30 which shares several similarities with that shown in FIG. 1. Consequently, parts which are identical or have the same function have been given the same reference numbers. However, certain elements such as the slope detector and discriminator have not been shown for simplification of the drawings.

In the fiber-optic system 30 according to FIG. 3, an optical fiber 31 and a pulse repeater 14 constitute the parts of a closed signal path which determines the cycle period length of a signal circulating partly as an optical signal and partially as an electrical signal. In contrast to the embodiment according to FIG. 1, however, the optical fiber 31 here is guided along an "open" path, of which the beginning and end can be located very far apart. The light path which leads back from the light-pulse transmitter 16 through the fiber to receiver 17 of the light-pulse repeater 14, marked by the optical fiber 31, is closed at the end 32 away from the transmitter receiver of optical fiber 31 by a mirror 33, which reflects the light pulses coming from transmitter 16 as quantitatively as possible into optical fiber 31, so that they can be received at the receiver and/or transmitter end of optical fiber 31.

To decouple the returning light pulses from the optical signal path upon the receiver diode 17, a partially transparent mirror 37, mounted at 45° to the path of the optical axis 36 in the vicinity of the near end 34 of optical fiber 31, is provided. While reflective in the return signal direction, mirror 37 is transmissive in a manner allowing the light pulses produced by transmitting diode 16 and sent along optical axis 36 to pass from a deflecting mirror 38 to end 34 of fiber 31. Mirror 38, provided according to FIG. 3, can be eliminated, if desired, if the transmitting diode 16 is so mounted that the light pulses which it produces emerge in the direction of optical axis 36. Since, in the arrangement according to FIG. 3, the light pulses pass through fiber 31 twice, twice the fiber length 2 L must be used when evaluating the measured cycle period length T according to equation (2) instead of a single fiber length L.

Figure 4:
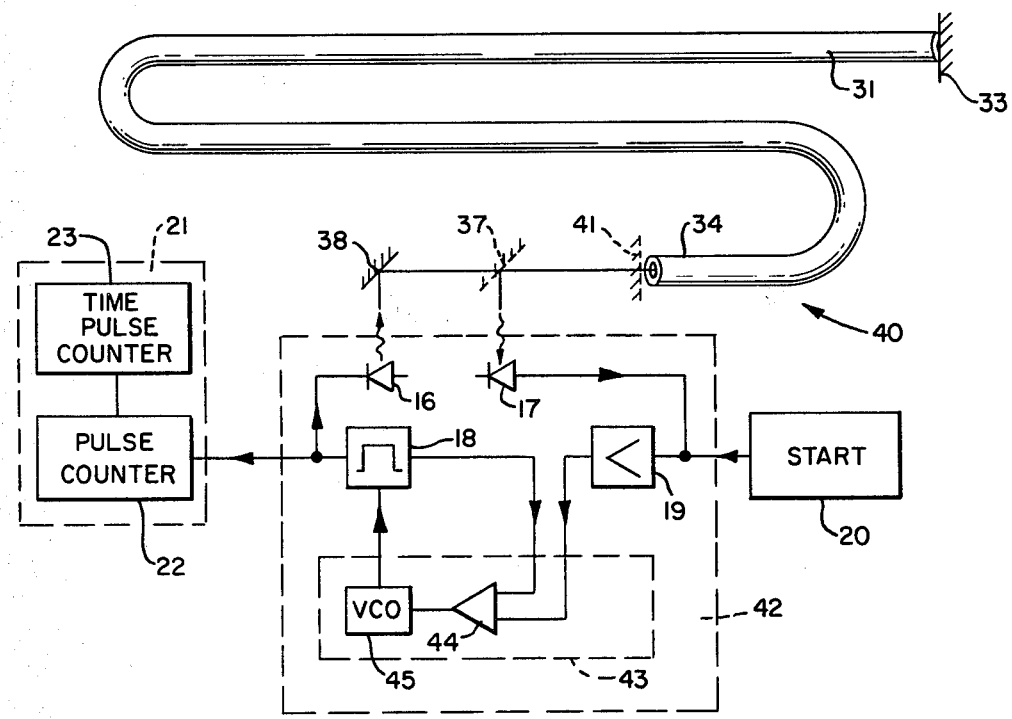
FIG. 4 is a modification of the fiber-optic measuring device according to FIG. 3, with an optical fiber operated in resonance, with weak coupling to the light-pulse transmitter.

Naturally, this is also valid for another fiber-optic system 40 shown in FIG. 4, which constitutes a modification of the system 30 shown in FIG. 3. Parts with the same function are once again given the same reference numbers as in FIG. 3. As far as its optical design is concerned, the fiber optic system 40 differs from that in FIG. 3 only in that its optical fiber 31 is covered at the end 34 near the transmitter and/or receiver by a slightly transparent mirror 41, which has a transparency for example of approximately 10%. By itself, this results in a situation in which a primary light pulse sent in a time $t_O$ is reflected back and forth several times in fiber 31, whereby its amplitude decreases exponentially, since each time it hits the partially transparent mirror 41 a certain fraction of its light power is decoupled. The receiver, accordingly, "sees," following each generated primary light pulse, a train of pulses of decreasing intensity, whose time interval is equal to their transmit time T over twice the fiber length 2 L. If these pulses are selected for determining the transit time T, without allowing them to circulate through the pulse repeater 42, the variations in transit time $t_{el}$ in the pulse repeater, which cause measurement error, will have been eliminated in a simple manner.

In order to obtain a number of signal pulses which is sufficient for sufficiently accurate averaging, it is possible to proceed in such a manner that after a safety interval, starting when the last pulse which still has sufficient intensity for reliable detection, has been received, a primary pulse is once again produced and the pulse train initiated by this pulse is then analyzed. Naturally, this results in increased measurement times, and the system also becomes sensitive to variations in the intensity of the primary pulses. These problems, not very serious of themselves, can be avoided by providing the pulse repeater 42 according to FIG. 4 with a control circuit 43, which adjusts the electronically influenceable transit time $t_{el}$ in such manner that the latter is equal to the transit time $t_{opt}$ of the light pulses in optical fiber 31.

A control circuit 43 of this kind can be constructed with known electronic components, for example by performing in a phase comparator 44 a comparison of the trigger pulses emitted by pulse shaper 18 with the output pulses of the receiver amplifier 19. A control signal is produced which influences the frequency of a voltage-controlled oscillator 45 that controls pulse shaper 18 in a compensating manner. Thus, the output signal of the control circuit 43, which affects the pulse shaper 18, always has a period length T which corresponds to the transit time $t_{opt}$ of the light pulses in optical fiber 31. The fiber-optic system 40 will then operate in resonance, and the light pulses to be detected by receiver 17 will have the same intensity. If the frequency of the oscillator controlling the pulse shaper 18 is adjusted to a value which is equal to a whole-number multiple of the pulse train circulation frequency $t_{opt}$ — in optical fiber 31, the result is a correspondingly increased number of signal pulses which is more favorable for exact averaging, and measurement time can be shortened.

Figure 5:
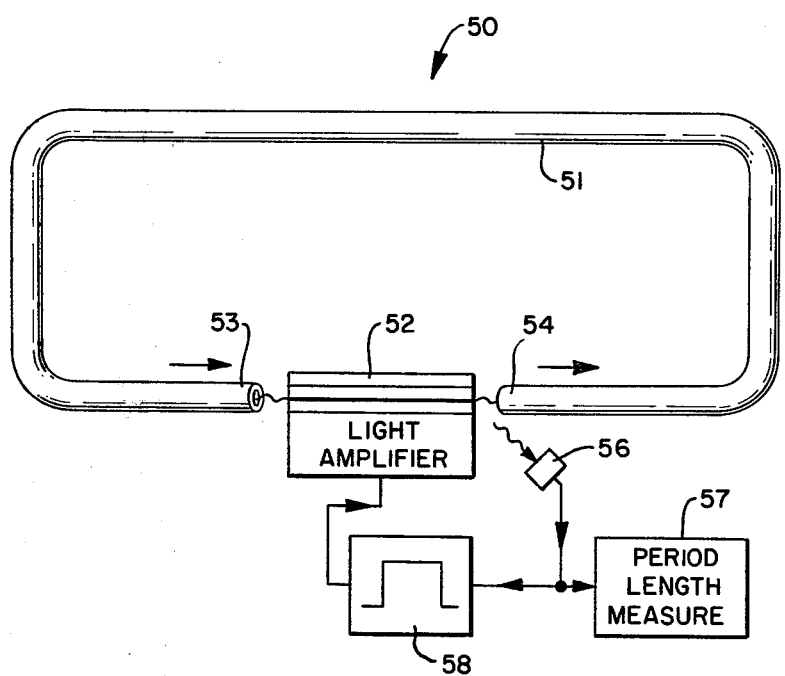
FIG. 5 shows a fiber-optic arrangement similar to the fiber-optic arrangement in FIG. 1, with a pulse repeater designed as an optical amplifier.

In the fiber-optic system 50 shown in FIG. 5, whose optic fiber 51, as in the embodiment shown in FIG. 1, is mounted along a closed path, an optical amplifier 52 is used as a pulse repeater. This optical amplifier directly and optically amplifies the light signal arriving at one end 53 of optical fiber 51, and then feeding it in again at the other end 54. The two ends 53 and 54 of optic fiber 51 are therefore directly coupled with the ends of the optical amplifier 52 which are opposite each other, said amplifier being for example a glass fiber doped with $Nd^{3+}$ ions in known fashion (see, for example, *Optical Electronics II*, Vol. 18, No. 1, pp. 86, 87, July 1976). Alternatively, the amplifier may be designed like the well-known GaAs laser, but without reflectors.

Optical amplifier 52 is operated in rhythm with the received light signal, so that an appropriate, nonlinear characteristic for amplifier 52 makes it possible for the emitted pulses always to be shorter than those received. A portion of the periodic light signal is coupled out and received with a photodiode 56. The output signal from this doide 56 is analyzed in the manner described above by a period-length measuring device 57, and simultaneously controls a pulse shaper 58, which, in the proper rhythm and in the proper phase, supplies the power to the optical amplifier 52.

An important advantage of using the optical amplifier 52 as a pulse repeater consists in the fact that the disturbances or disadvantageous influences upon the measurement accuracy, caused by the electronic transit times and their variations, are avoided completely. It should be understood that by appropriately modifying the arrangements in FIGS. 1, 3, and 4, in a manner consistent with the above descriptions, the latter can also be operated with an optical amplifier as a pulse repeater.

Figure 6:
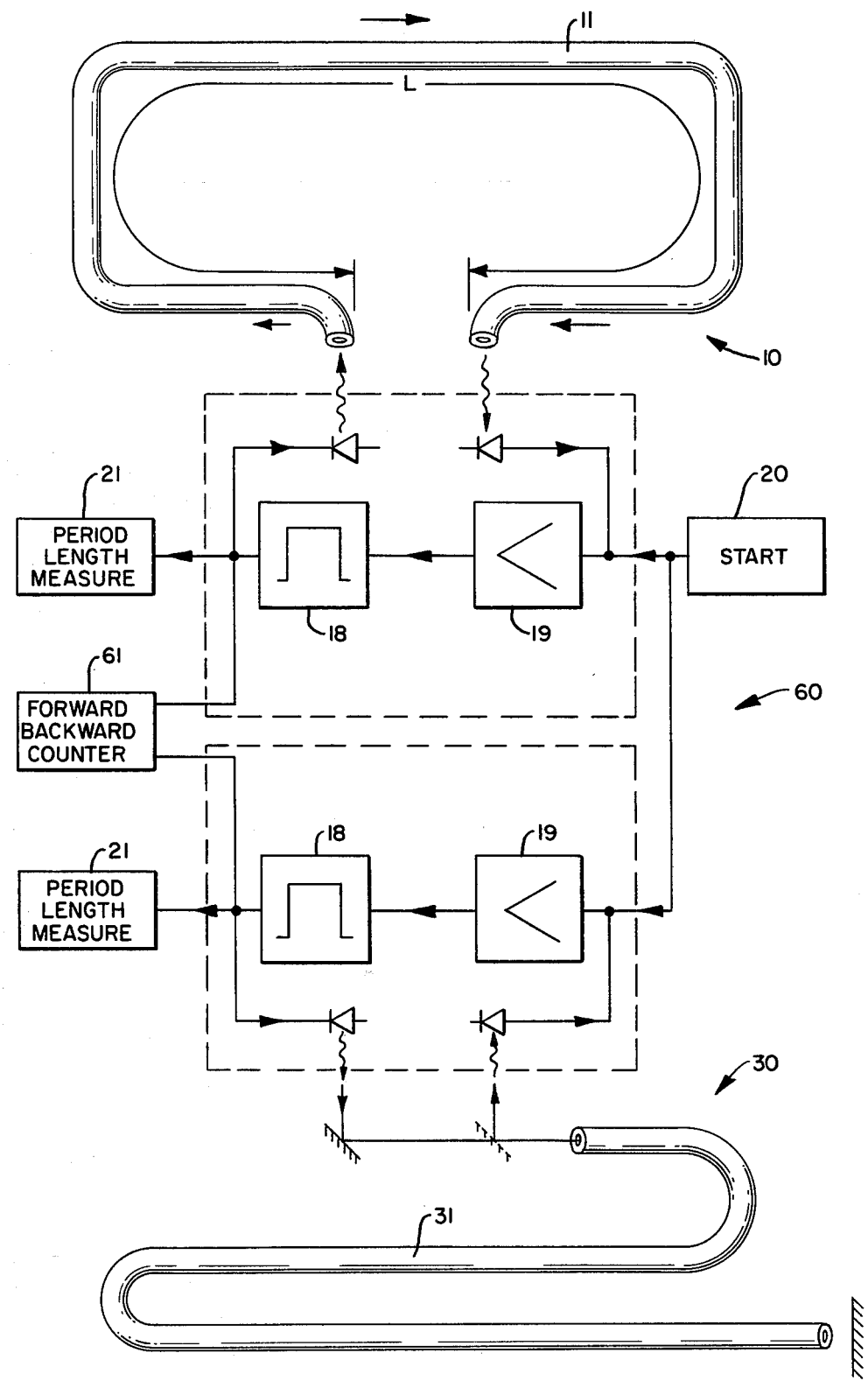
FIG. 6 is a fiber-optic measuring device according to the invention, with a measuring signal path and a reference signal path.

Finally, FIG. 6 shows a fiber-optic system 60 which essentially constitutes a combination of the fiber-optic system 10 in FIG. 1 and a fiber-optic system 30 according to FIG. 3. A fiber-optic system 10 is used to monitor the length L of a path covered by its optical fiber 11, while the other fiber-optic system 30, whose optical fiber 31 has a length which is approximately equal to half the average length of the optical fiber 11 mentioned above, serves as a reference signal path. It is so disposed that it is not subject to the expansions which are to be detected by means of optical fiber 11, but is subject to all other influences which determine the transit time in optic fiber 11 e.g. temperature. The pulse repeaters 14, associated with measurement-signal path 11 and reference-signal path 31 can be initiated by a common starting device 20. The output signals of their pulse shapers 18 are the input signals of a forward/backward counter 61. This counter 61 counts the output pulses of the pulse shaper 18 associated with measurement-signal path 11, for example, in a forward direction, and the output pulses of the pulse shaper 18 associated with reference signal path 31 in a backward direction. The forward-backward counter 61 can be set to zero at the start of measurement, so that its final counter status at the end of a measurement not only shows the amount of change in length in the monitored path which has been detected, but also shows the direction in which the path changed.

Naturally, the measurement-signal path/reference-signal path combination of a system analogous to FIG. 6 can be accomplished using any combination of the devices described in FIGS. 1 and 3 to 5, and it should also be understood that measures which are described only in connection with one of the systems can also be used on the others. In particular, it may be advantageous for an exact determination of period length and/or repetition frequency to which the circulating signals are subject, if the pulse shaper 18 of the pulse-repeater produces a characteristically coded "pulse word", i.e., a characteristic sequence of output pulses, whose decoding at the receiver produces a single pulse to reactivate the pulse shaper. These decoded pulses, characteristic for the appearance of a certain pulse combination, could then be counted and the cycle period length T could be determined very accurately from their temporal spacing.

It is to be understood that the above-described arrangements are simply illustrative of the application of the principles of this invention. Numerous other arrangements may be readily devised by those skilled in the art which embodies the principles of the invention and fall within its spirit and scope.

We claim:

1. An apparatus for measuring the influence of physical parameters upon the length of a path, comprising: an optical length-measuring device responding to a change in the path length including an elastically stretchable optical fiber mounted in a pretensioned manner at intervals along the path at supporting points which are subjected to a change in position with a change in the length of the path to thereby change the length of the optical fiber in an amount corresponding to the change in path length;

a transit-time measuring device including a lightpulse repeater optically coupled to the optical fiber to form a closed signal path together with the optical fiber, wherein said repeater generates short signal pulses which circulate repeatedly in said path, and means for measuring the total transit time T equal to the transit time $t_{opt}$ of the pulse through the optical fiber and the transit time $t_{el}$ of the pulse through the pulse repeater; and means for determining a change in the path length by monitoring changes in transit time of the pulse through the optical fiber caused by changes in the length of the optical fiber brought about by changes in the path length to which the optical fiber is coupled.

2. An apparatus according to claim 1, wherein the period T of the signal pulses is equal to the total transit time through the signal path.

3. An apparatus according to claim 1, wherein the means for measuring the total transit time of the pulses through the optical fiber includes means for averaging the measurement of the total transit time over a number of signal cycles.

4. An apparatus according to claim 1, further comprising display means coupled to the means for measuring the total transit time.

5. An apparatus according to claim 3, further comprising display means coupled to the means for measuring the total transit time for providing a display based on the total transit time and the number of signal cycles for which the total transit time is averaged.

6. An apparatus according to claim 1, wherein the transit time portion $t_{opt}$, governed by the fiber length, of the total period length T is large relative to the transit time portion $t_{el}$ of the pulse repeater.

7. Apparatus according to claim 1 or claim 6, comprising a starting device for initiating the pulse repeater and a first counter counting the output pulses of a quartz-controlled oscillator, and a second preset counter which counts the pulses circulating in the signal path, wherein the signal-pulse counter generates a stop pulse which deactivates the first said time-pulse counter after the predetermined final counter status is reached.

8. An apparatus according to claim 1 or claim 6, wherein the transit time $t_{opt}$ through the optical fiber for a total transit time of 1 microsecond is at least 20 times greater than the transit time $t_{el}$ in the pulse repeater, and wherein the counting time interval is approximately 1 second.

9. An apparatus according to claim 1, wherein the pulse duration of the light pulses emitted by pulse repeater is shorter than the duration of the light pulses received by the pulse repeater.

10. An apparatus according to claim 9, wherein the pulse duration of pulses emitted by the pulse repeater is constant.

11. An apparatus according to claim 1, wherein the pulse repeater includes a light pulse transmitter and a light pulse receiver.

12. An apparatus according to claim 11, wherein the lightpulse transmitter comprises a light-emitting diode, said diode being driven by the output pulses of a pulse shaper, said shaper receiving as trigger input signals, the suitably amplified output signals from the light pulse receiver which comprises a photoelectric detector which receives the light pulses after they pass through the optical fiber.

13. An apparatus according to claim 11, wherein the light-pulse transmitter is operated by output signals from a discriminator circuit, said circuit generating a trigger signal when the signal amplitude of the light signals received at the receiver reaches a predetermined fraction of the maximum signal amplitude.

14. An apparatus according to claim 11, wherein the light-pulse transmitter is triggered by the output pulses from a slope detector which responds to the rising and falling slopes of the output pulses of the light receiver, the output signals of said slope detector having a definite temporal relationship to the temporal center of the received light pulses.

15. An apparatus according to claim 1, wherein the pulse repeater generates a pulse combination comprising a plurality of light pulses within a cycle time $T = t_{opt} + t_{el}$.

16. An apparatus according to claim 12, wherein the light pulses are distributed over at least a portion of a cycle period length T with approximately equal pulse intervals.

17. An apparatus according to claim 1, wherein the optical fibers are gradient fibers with a refractive index which increases from the cladding to the core.

18. An apparatus according to claim 13, wherein the optical fiber is in the form of a monomode fiber, and the light pulse transmitter is a pulsed laser.

19. An apparatus according to claim 1, wherein the optical fiber is a quartz fiber and the wavelength of the pulsed light is approximately 1.3 microns ±0.05 micron.

20. An apparatus according to claim 11, wherein the optical fiber is terminated at its remote end by a mirror and, wherein for coupling into the receiver the pulses returning to the input end of the optical fiber, a partially transparent mirror is provided.

21. An apparatus according to claim 20, wherein the optical fiber is also terminated at said input end by a partially transparent mirror, said partially transparent mirror reflecting most of the light emerging from the fiber back into the fiber.

22. An apparatus according to claim 21, wherein the electronic transit time $t_{el}$ of the receiver-transmitter section of the pulse repeater is equal to the optical transit time $t_{opt}$ of the light pulse in the optical fiber.

23. An apparatus according to claim 21, wherein the electronic transit time $t_{el}$ of the receiver-transmitter section of the pulse repeater is equal to a unit fraction of the optical transit time $t_{opt}$.

24. An apparatus according to claim 21, wherein the electronic transit time $t_{el}$ of the receiver-transmitter section of the pulse repeater is equal to a whole-number multiple of the optical transit time $t_{opt}$.

25. An apparatus according to claim 22, 23 or 24, wherein the pulse-train frequency of the light pulses generated by the light-pulse transmitter is determined by the output frequency of a voltage-controlled oscillator, which receives the output signal of a phase-sensitive detector as the input signal which determines the output frequency, said phase-sensitive detector generating, from a comparison of the phase position of the output signal of a pulse shaper with the output signal of a receiver amplifier, a control signal proportional to the phase difference between these signals, for compensatory frequency changing of the voltage controlled oscillator.

26. An apparatus according to claim 1, wherein the pulse repeater includes an optical amplifier.

27. An apparatus according to claim 26, wherein the optical amplifier is comprised of a segment of an optical fiber doped with $Nd^{3+}$ ions.

28. An apparatus according to claim 26, wherein a GaAs laser modified by an antireflection coating, is used as the optical amplifier.

29. An apparatus for measuring the influence of physical parameters upon the length of a path, comprising: an optical length-measuring device responding to a change in the path length including an elastically stretchable optical fiber mounted at intervals along the path at supporting points which are subjected to a change in position with a change in the length of the path; and
   a transit-time measuring device including a light-pulse repeater optically coupled to the optical fiber to form a closed signal path together with the optical fiber, wherein said repeater generates short signal pulses which circulate repeatedly in said path, and means for measuring the total transit time T equal to the transit time $t_{opt}$ of the pulse through the optical fiber and the transit time $t_{el}$ of the pulse through the pulse repeater, further comprising a reference-signal path, activatable and deactivatable simultaneously with said path to be measured, said reference signal path including an optical fiber having an optical length which corresponds to an average value of the optical lengths of the fiber of the measuring path to be measured.

30. An apparatus for measuring a physical parameter by detecting its influence upon the length of a path comprising:
   an optical fiber mounted along said path in a pretensioned state between at least two successive support points, said optical fiber having first and second ends;
   a light pulse transmitter generating in controlled sequence light pulses which are fed into the fiber at the first end nearest said transmitter, the duration of the pulses being short compared with their transit time $t_{opt}$ along the optical fiber;
   a mirror terminating the optical fiber at the second end remote from the transmitter which reflects the light pulses back to the first end of the fiber;
   means for coupling out part of the light emerging from the first end of the fiber onto a light pulse receiver generating electrical pulses in response to the received light pulses;
   a weakly transparent mirror arranged to terminate the optical fiber at its first end, wherein the reflectivity of the weakly transparent mirror will reflect a portion of the light pulses which are travelling toward the first end from the terminating mirror at the second end back into the optical fiber so that a primary light pulse from the light pulse transmitter will produce multiple reflections in the optical fiber;
   means for evaluating the path length from the time interval between successive light pulses emerging through the weakly transparent mirror as a result of the multiple reflections between the terminating mirror in response to a primary light pulse generated by the light pulse transmitter; and
   pulse repeater means, including the receiver, the transmitter, and transmitter control means, for repeatedly generating said primary light pulses.

31. Apparatus according to claim 30, wherein the electronic response time $t_{el}$ of the pulse repeater means is equal to the optical transit time $t_{opt}$ of the light pulses from the first input end to the second remote end and back to the first end of the fiber.

32. Apparatus according to claim 30, wherein the electronic transit time $t_{el}$ of the pulse repeater means is equal to a unit fraction of the optical transit time $t_{opt}$ of the light pulses from the first input end to the second remote end and back to the first input end of the fiber.

33. An apparatus according to claim 30, wherein the electronic transit time $t_{el}$ of the pulse repeater means is equal to a whole-number multiple of the optical transit time $t_{opt}$ of the light pulses from the first input end of the second remote end and back to the first input end of the fiber.

34. An apparatus according to claim 30, further comprising a reference-signal path, activatable and deactivatable simultaneously with said path to be measured, said reference signal path including an optical fiber having an optical length which corresponds to an average value of the optical lengths of the fiber of the measuring path to be measured.

35. An apparatus according to claim 30, wherein the transparency of the weakly transparent mirror is approximately 10%.

36. A method for measuring the influence of physical parameters upon the length of a path, comprising:
   mounting an elastically stretchable optical fiber in a pretensioned manner at intervals along the path at supporting points which are subjected to a change in position with a change in the length of the path so that a change in the length of the path will produce a change in the length of the optical fiber;
   optically coupling a light pulse repeater to the optical fiber to form a closed signal path together with the optical fiber;
   generating short signal pulses which circulate repeatedly in said path;
   measuring the total transit time T equal to the transit time $t_{opt}$ of a pulse through the optical fiber and the transit time $t_{el}$ of the pulse through the pulse repeater; and
   determining a change in the path length by monitoring changes in the transit time of the pulse through the optical fiber caused by changes in the length of the optical fiber brought about by changes in the path length to which the optical fiber is coupled.

37. A method according to claim 36, further comprising averaging the measurement of the total transit time over a number of signal cycles.

38. A method according to claim 36, wherein the transit time $t_{opt}$ through the optical fiber for a total transit time of 1 microsecond is at least 20 times greater than the transit time $t_{el}$ in the pulse repeater, and wherein the counting time interval is approximately 1 second.

39. A method according to claim 36, wherein the pulse duration of the light pulses emitted by pulse repeater is shorter than the duration of the light pulses received by the pulse repeater.

40. A method according to claim 39, wherein the pulse duration of pulses emitted by the pulse repeater is constant.

* * * * *

UNITED STATES PATENT AND TRADEMARK OFFICE
CERTIFICATE OF CORRECTION

PATENT NO. : 4,269,506
DATED : May 26, 1981
INVENTOR(S) : M. Johnson et al

It is certified that error appears in the above-identified patent and that said Letters Patent are hereby corrected as shown below:

On the title page add:

--[30] Foreign Application Priority Data
Apr. 18, 1978  Germany  P 28 16 682.7--

Signed and Sealed this

Fifteenth Day of May 1984

[SEAL]

Attest:

GERALD J. MOSSINGHOFF

Attesting Officer      Commissioner of Patents and Trademarks